G. W. BROWN.
Corn-Planter.
No. 1,040
Reissued Sept. 11, 1860.
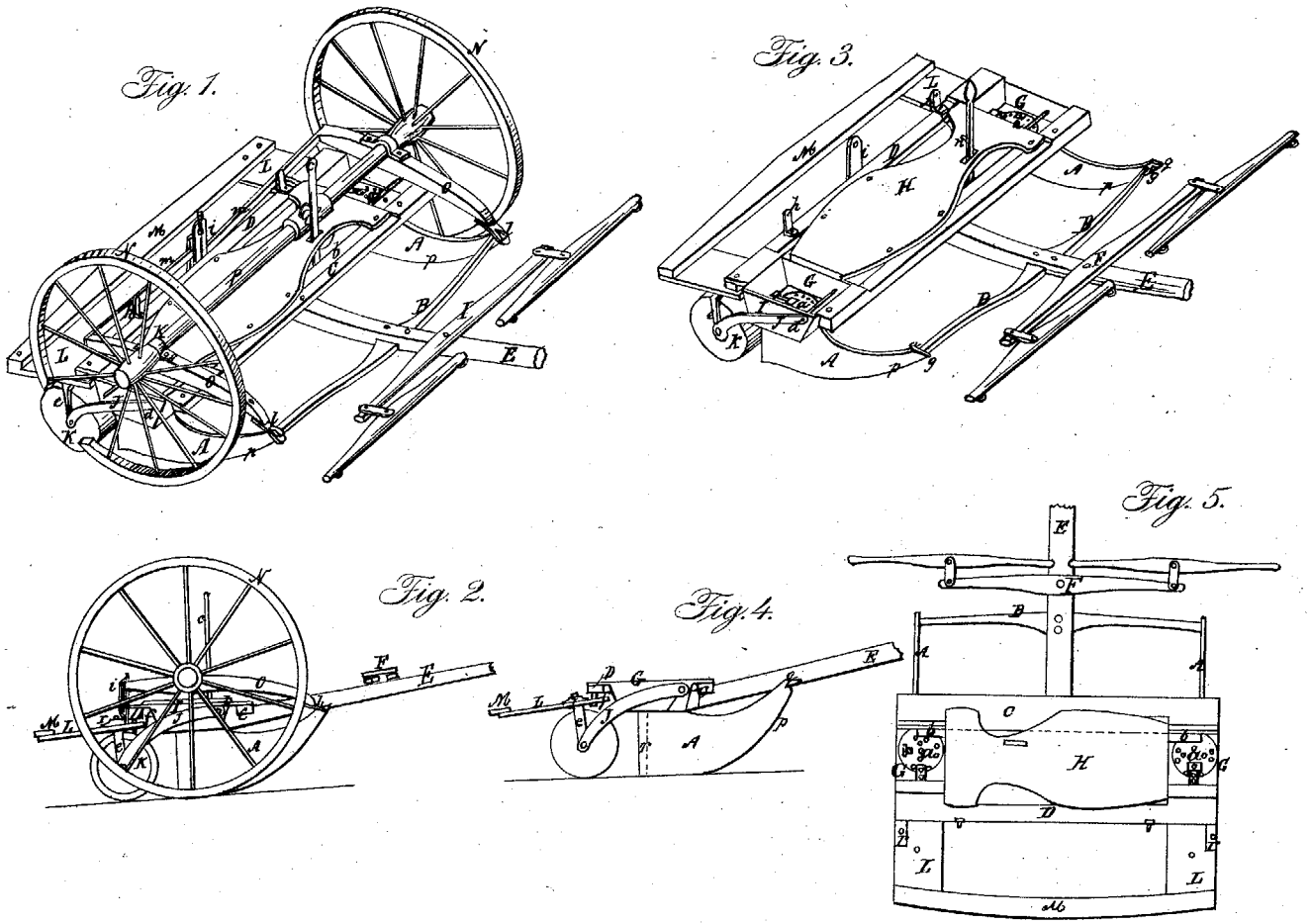
Witnesses:
E. Cohen
J. Hirsch
Inventor:
George W. Brown
By atty
A. B. Stoughton
AM. PHOTO-LITHO. CO. N.Y. (OSBORNE'S PROCESS.)

UNITED STATES PATENT OFFICE.

GEORGE W. BROWN, OF GALESBURG, ILLINOIS.

IMPROVEMENT IN SEED-PLANTERS.

Specification forming part of Letters Patent No. 9,893, dated February 2, 1853; Reissue No. 526, dated February 16, 1858; Reissue No. 1,040, dated September 11, 1860.

DIVISION E.

*To all whom it may concern:*

Be it known that I, GEORGE W. BROWN, of Galesburg, in the county of Knox and State of Illinois, have invented certain new and useful Improvements in Seed-Planters; and I do hereby declare the following to be a full, clear, and exact description of the construction and operation of the same, reference being had to the accompanying drawings, making a part of this specification, in which—

Figure 1 represents a perspective view of my seed-planting machine arranged for automatic or "machine dropping," as it is termed, and supported on an extra pair of wheels, which are both supporting and driving wheels. Fig. 2 represents a side elevation of the same. Figs. 3, 4, and 5 represent respectively a perspective, a side elevation, and a top plan of the same machine with the extra wheels removed therefrom to convert it into a hand-planter.

Similar letters of reference, where they occur in the several figures, denote the same parts of the machine in all of them.

It is sometimes desirable in the planting of seeds to have the seed-slides worked automatically. The object and purpose of this part of my invention is to so construct and apply an extra pair of wheels as that they may sustain a portion of the weight of the machine and prevent the seeding and covering devices from pressing too hard onto or into the ground, and serve also to work the seed slides or valves, but to be readily removable when the machine is to be converted into a hand-planter; and the nature of my invention consists, first, in combining with a seed-planting machine, carried mainly by or upon not less than two runners and two covering-wheels, a pair of auxiliary wheels and an axle or support for them to turn on or with for the double purpose of taking a portion of the weight off from said runners and covering-wheels and for affording the means for changing or converting the machine from a hand-planter to an automatic seed-sower; and, secondly, hanging the axle of the auxiliary wheels in hinged and adjustable arms or levers, so that more or less of the weight of the machine may be placed on said auxiliary wheels.

To enable others skilled in the art to make and use my invention, I will proceed to describe the same with reference to the drawings.

A A represent a pair of runners or shoes properly braced apart by cross-pieces B C D in any manner that will make them sufficiently rigid, and at a distance from each other equal to that between the rows or hills of corn or other seed to be planted.

E is a tongue united to the cross-pieces in any of the usual modes, so as to be midway between the runners. To this tongue, which may be said to constitute a part of the frame of the machine, the double-trees F, to which the team is hitched, are fastened. The seed-hoppers G G are secured to this frame immediately over the rear of the runners. The seed slides or valves *a*, that allow the grain in measured or regulated quantities to pass out of these hoppers and into the gash or furrow prepared for them by the shoes or runners, are connected together by a bar, *b*, to which a lever, *c*, or its equivalent is attached, so that the vibrating of said lever will work said slides or valves.

To the side pieces I I of the frame are connected two bars or levers, J, (one only being seen in the drawings, but both alike,) by a pivot pin or hinge-joint, at *d*, at their front ends, and at their rear ends they slip over the journals of the rollers or wheels K. To these journals are also attached by dead-eyes or bearings the stirrup-straps *e*, to which the pieces L L are attached, the rear ends of said pieces L being connected by a cross-bar, M, which the driver, who walks in the rear of the machine, may catch hold of to raise up or press down the runners or shoes. The side pieces L are hinged to the cross-piece D of the front frame by bolts passing through slots, as at *f*, or otherwise, so that the rollers may rise and fall to accommodate themselves to the ground without disturbing the runners, and so that the runners may yield or move independently of the rollers. This constitutes mainly the framework, which is simple, cheap, strong, and efficient for the purpose.

The notch *g* in the front ends of the runners, and the lugs *h i j*, connected to the cross-bar D, are for the purpose of applying the auxiliary wheels N and converting the machine from a hand to a machine dropper. When the wheels N N are to be used the two bars O O, on which the boxes or bearings *k* for the axle P are placed, are hooked over the ends of the runners, as seen at *l*, and the rear ends of these bars have arms or levers *m* fastened to them, which levers have their fulcra at *h j*, and their free ends meet in a guide and supporting piece, *i*, where, by means of a pin and adjusting-holes, they may be regulated so as to raise and lower and hold at any proper height the rear ends of said bars O O, and consequently raise and lower or hold the wheels N on them at such regulated height as may be desired, and supporting more or less of the frame-work of the machine, as also defining the distance that the seeding devices shall penetrate the ground. The wheels and axle being thus placed, a pin, *n*, in the lever *c* takes into the zigzag *o* on the axle, and the seed slides or valves are then operated automatically, and the attendant riding on the machine dispensed with.

*r r* are buttons so hinged or pivoted on the pieces L that they may have either end turned underneath the bar D, or turned out from under it entirely. These buttons act as wedges between the pieces L L and D, and define the extent of motion between them when turned under D. The ends of these buttons are of different heights, so that a regulated adjustment may be made by them.

Figs. 1 and 2 show distinctly the form and character of the machine with the auxiliary wheels applied, while Figs. 3, 4, and 5 as distinctly show the form and character of the machine when supported and carried solely on its runners and covering and supporting wheels K.

The wheels N, when applied and used with my machine, perform all the essential operations of wheels as generally applied to seed-planting machines, but may be dispensed with without any detriment to the machine when used as a hand-planter.

Having thus fully described this part of my invention, what I claim under this patent is—

1. In combination with a seed-planting machine carried mainly by or supported mainly upon not less than two runners and two covering-wheels, a pair of auxiliary wheels and an axle for the double purpose of taking a portion of the weight off from said runners and covering-wheels and for affording the means of readily converting the machine from a hand-planter to an automatic seed-sower, substantially as described.

2. Hanging the axle of the auxiliary wheels in hinged and adjustable arms or levers, so that more or less of the weight of the machine may be placed upon said auxiliary wheels, substantially as described.

GEO. W. BROWN.

Witnesses:

A. B. STOUGHTON,

E. COHEN.